United States Patent Office 3,062,769
Patented Nov. 6, 1962

3,062,769
DIALLYL 2,5-DIPHENYLADIPATE AND COMPOSITIONS PREPARED THEREFROM
Stanley P. Rowland and Melvin F. Maringer, Cincinnati, Ohio, assignors to National Distillers and Chemical Corporation, New York, N.Y., a corporation of Virginia
No Drawing. Filed Nov. 24, 1959, Ser. No. 855,012
4 Claims. (Cl. 260—31.8)

The present invention relates to a novel ester, namely diallyl 2,5-diphenyladipate, and novel compositions prepared by using same, including plastics and curable vinyl plastisols having improved properties resulting by use of said ester.

The novel ester embodied herein can be prepared by conventional esterification with allyl alcohol of 2,5-diphenyladipic acid and/or transesterification reaction with or without an esterification catalyst but preferably with use of such a catalyst. The preferred method involves refluxing about one mole of 2,5-diphenyladipic acid with at least two moles of allyl alcohol and, preferably, from about 3 to about 5 moles of the alcohol although a higher excess of the alcohol can be used if desired. Moreover, a diluent such as an inert solvent (e.g., benzene, xylene, toluene, $CHCl_3$, $CCl_4$, etc.) can be used, when convenient, for lowering the reflux temperature. Generally, the resulting ester is then washed to remove residual (if any) acids, and subjected to distillation at reduced pressure to remove excess alcohol and moisture. Alternatively, the desired ester may be made by ester interchange of allyl alcohol with dimethyl 2,5-diphenyladipate or by ester interchange in which an allyl group of an allyl ester is utilized for interchange with the alcohol portion of an ester of 2,5-diphenyladipic acid.

Regarding catalysts suitable for preparation of the ester embodied herein, conventional esterification catalysts may be used, including for purposes of illustration, p-toluene sulfonic caid, sulfuric acid, titanium tetrachloride, methane sulfonic acid, phosphoric acid, ethylphosphoric acid, etc.

In a specific embodiment, diallyl 2,5-diphenyladipate was prepared by use of the following procedure:

Apparatus—a three-necked reaction flask fitted with a reflux condenser with attached water-collecting trap, a thermocouple for liquid temperature measurement, and a fitting to permit gas purging and sampling during the esterification reaction.

The flask was charged with 2,5-diphenyladipic acid, a 50% molar excess of allyl alcohol based on the amount theoretically required to fully esterify the acid, 1% by weight of p-toluenesulfonic acid, based on the weight of the 2,5-diphenyladipic acid, and benzene in an amount approximately equal to 50–80% by weight of the allyl alcohol to serve as an azeotrope solvent for water removal.

The flask containing the aforesaid materials was heated by a Glas-Col electrical heating mantel to reflux temperature while, during the heating thereto, the flask was purged with nitrogen. The reaction was carried out at reflux temperature (96–98° C.) until all the water of reaction was collected in the condenser trap. Excess alcohol was then removed by raising the liquid temperature to 130–140° C. The resulting liquid product (acid No. of 3–5) was cooled and removed from the flask for refining.

The liquid product was then mixed at room temperature with an excess of a 10% caustic solution, followed by slowly stirring the solution while heating to 55° C., held at that temperature for 15 minutes, and allowed to cool and settle. After overnight settling, the soap layer was separated and the diester washed twice with hot water. For each wash, the water was allowed to separate and removed from the diester. One-half percent by weight of Nuchar 190 (activated carbon) was then added to the diallyl 2,5-diphenyladipate and heated at 130° C. with agitation until dry. By vacuum filtration over a Celite No. 512 filter aid, a purified diallyl 2,5-diphenyladipate having the following physical properties was obtained.

| | |
|---|---|
| Specific gravity @ 20° C./20° C. | 1.0875. |
| Acidity (as acetic acid) | 0.1%. |
| Moisture | 0.1%. |
| Color (APHA)-Pt-Co | 150. |
| Absolute viscosity @ 20° C. | 388 (centipoises). |
| Refractive index @ 25° C. | 1.5344. |
| Pour point | 0° F. (−17.8° C.). |
| Flash point | 275° F. (135° C.). |
| Fire point | 500° F. (280° C.). |
| Thermal expansion @ 10–40° C. | 0.00062 cc./° C. |
| General solubility | Insoluble or limited solubility in gasoline, mineral oil, glycerine and glycols. Soluble in many other organic liquids, including methanol, ethanol, acetone, methyl ethyl ketone, ethyl acetate, etc. |

The diallyl ester of 2,5-diphenyladipic acid embodied herein possesses an unusual combination of properties which may be particularly illustrated by the marked and unexpected improvements that result by use of such an ester in preparation of materials such as plastic compositions and curable vinyl plastisols.

In plastic compositions, diallyl 2,5-diphenyladipate provides plastics imparted with an unusual and desirable combination of properties. Thus, it has been found that plastics of superior characteristics with respect to electrical properties, resistance to alkalies and acids, and flexural modulus can be prepared using dially 2,5-diphenyladipate. This allyl ester may be employed and cured directly into a shaped object or the plastic composition may be manufactured by (a) initially partially polymerizing said diallyl ester to a thermoplastic reactive prepolymer soluble in organic solvents, and (b) forming or shaping the prepolymer to a desired form (e.g., molds) with curing until complete polymerization (cross-linking) to a thermoset polymer is obtained.

The preferred method of polymerization is the two step process. Minimum curing time and optimum properties are obtained by this method. The prepolymer formation may be carried out in bulk, solution, or as a dispersion and such polymerization may be modified with a chain length regulator or polymerization modifier. Temperature employed in the prepolymer formation step will depend on the catalyst and the rate of polymerization controllable by the method of polymerization employed. Separation of the monomer from the prepolymer may be accomplished by employing the difference in organic solubility of the monomer and the prepolymer, the difference in boiling point of the monomer and the prepolymer, or other difference in physical properties. Thus said separation can be accomplished by precipitation, distillation, etc., or a combination of these methods. The desirable result of the prepolymer polymerization and separation process is a solid prepolymer product, preferably as a free-flowing powder, which is thermoplastic, soluble in organic solvents, and characterized by a minimum of cross-links.

The resulting prepolymer product is then mixed, with catalyst and cured to a thermoset plastic in the desired form or shape by molding, laminating, coating, or similar process. It is preferred to use an organic solvent to obtain thorough mixing of the catalyst and prepolymer, and this solvent is removed prior to or during final cure processing. The temperature and time for final cure will depend on the catalyst and the fabrication process. In general the final curing process is from 5 to 60 minutes at 270–325° F.

As catalysts for the prepolymer formation as well as for the curing of the plastics utilizing diallyl 25-diphenyladipate, conventional cross-linking catalysts may be used, including for purposes of illustration and not limitation, peroxy type catalysts such as t-butyl perbenzoate, t-butyl peracetate, t-butyl peroxyisobutyrate, p-chlorobenzoyl peroxide, acetyl peroxide, benzoyl peroxide, 2,4-dichlorobenzoyl peroxide, etc. Conventional additional ingredients can also be incorporated in the plastic compositions, such as fibers and fillers, processing aids, and pigments and organic dyes. For example such fibers and fillers as fiber glass, mineral fillers, synthetic fibers (Dacron, Orlon, nylon, etc.), cellulose, asbestos, etc. may be employed for the attainment of desirable physical and electrical properties. Processing aids such as lubricants and mold release agents may be employed to improve processing results. Also a small amount of monomer depending on the fabrication process may be added to aid cross-linking during the final cure.

In order to illustrate the markedly superior type of plastic composition obtained from diallyl 2,5-diphenyladipate, a plastic composition was prepared by the following procedure:

Liquid diallyl 2,5-diphenyladipate was converted to a prepolymer stage by bulk polymerization technique wherein the diallyl ester, blanketed with nitrogen, was warmed to 80° C. and, while maintained thereat, 2% of benzoyl peroxide was added. The polymerizing monomer was periodically checked for Gardner-Holt viscosity until a viscous syrup of Z6+1 bubble viscosity was obtained, at which the polymerizing ester was within a few minutes of gelation. The polymerizing reaction was terminated by pouring the viscous syrup into 10 volumes of methanol under agitation which resulted in separation of the prepolymer from the monomer and low molecular weight polymers by precipitation of the prepolymer. Several additional precipitations, for removal of low molecular weight components carried by the prepolymer, were carried out by dissolving the precipitated material in acetone (25% by weight solution) and then precipitating each volume of solution in six to eight volumes of methanol under rapid agitation. Three such precipitations followed by vacuum drying produced a free-flowing white prepolymer powder.

Molding compounds were produced by blending the prepolymer with 2% tert.-butyl perbenzoate catalyst and sufficient acetone to obtain thorough mixing of the prepolymer and catalyst. The solvent was removed from the resulting viscous solution by casting the solution on a warm (100-130° F.) roll mill and rotating until dry sheets of plastic could be removed from the mill. Upon cooling, the sheets became brittle and were broken into small chunks for molding. The molding compound was compression molded into 4 inch diameter discs of about ⅛ inch thickness and into 5″ x ½″ x ¼–½″ bars using compression molds at 275°–300° F., 3000–5000 p.s.i. and 30 minutes time. All were cooled to about 150° F. before removal from the molds, followed by heat conditioning for 4 hours at 250° F. to remove residual stresses, and subjected to evaluation with obtainment of the data set forth in the following tabulation. For comparative purposes, the tabulation shows data obtained from a diallyl phthalate plastic prepared in the same manner as aforedescribed for the diallyl-2,5-diphenyladipate.

TABLE

*Properties of Allyl Plastics*

| Type Test | Test | A.S.T.M. | Units | Diallyl Phthalate | Diallyl 2,5-Diphenyladipate |
|---|---|---|---|---|---|
| Electrical Properties | Arc Resistance | D495-56T | Seconds | 78 | 87 |
| | Dielectric Strength: Perpendicular, Short Time. | D149-55T | Volts/Mil | 347 | 379 |
| | Power Factor: | | | | |
| | 60 Cycles | D150-54T | | 0.027 | 0.028 |
| | 10³ Cycles | D150-54T | | 0.0135 | 0.0170 |
| | 10⁶ Cycles | D150-54T | | 0.0222 | 0.0109 |
| | Dielectric Constant: | | | | |
| | 60 Cycles | D150-54T | | 3.90 | 3.29 |
| | 10³ Cycles | D150-54T | | 4.00 | 3.23 |
| | 10⁶ Cycles | D150-54T | | 3.46 | 2.87 |
| | Loss Factor: | | | | |
| | 60 Cycles | D150-54T | | 0.105 | 0.0922 |
| | 10³ Cycles | D150-54T | | 0.0542 | 0.0562 |
| | 10⁶ Cycles | D150-54T | | 0.0767 | 0.0313 |
| | Volume Resistivity | D257-57T | Ohms-Cm | 1.96×10¹⁶ | 4.41×10¹⁵ |
| | Surface Resistivity | D257-57T | Ohms | 2.91×10¹⁶ | 5.38×10¹⁵ to ∞ |
| Physical Properties | Tensile Strength | D-638-58T | Lbs./Sq. In | 5,600 | 5,400 |
| | Flexural Strength | D790-58T | Lbs./Sq. In | 6,000 | 8,600 |
| | Compressive Strength | D695-54 | Lbs./Sq. In | 23,000 | 22,060 |
| | Izod Impact Strength | D256-56 | Ft. Lbs./In | 0.2 | 0.2 |
| | Deformation Under Load | D621-51 | Percent | 0.11 | 0.20 |
| | Density | | Grams/cc | 1.265 | 1.167 |
| | Barcol Hardness | | | 47 | 40 |
| | Water Absorption | D570-57T | Percent | 0.10 | 0.08 |
| | Flammability | D635-56T | In./Min | 0.5–0.6 | 0.5–0.6 |
| Chemical Resistance | Conc. HCl | D543-56T | Percent Wt. Change | 0.2 | 0.15 |
| | Conc. H₂SO₄ | D543-56T | do | −44.2 | −17.2 |
| | Dilute Acids | D543-56T | do | 0.2–0.3 | 0.1–0.2 |
| | Conc. Alkalies | D543-56T | do | 0.1–0.4 | 0.1–0.4 |
| | Dilute Alkalies | D543-56T | do | 0.3–0.5 | 0.2–0.3 |
| | Ketone Solvents | D543-56T | do | −0.1–0.1 | 0.5–0.6 |
| | Alcohol Solvents | D543-56T | do | 0.3–0.4 | 0.2–0.3 |
| | Ester Solvents | D543-56T | do | 0.1–0.2 | 0.3–0.4 |
| | Aromatic Solvents | D543-56T | do | 0.2–0.3 | 0.2–0.3 |
| | Hydrocarbon Solvents | D543-56T | do | 0.0–0.1 | 0.0–0.1 |

The superiority and utility of the diallyl 2,5-diphenyladipate plastic is exhibited by its electrical properties. Arc resistance, volume resistivity, and surface resistivity of the diallyl 2,5-diphenyladipate plastic are all significantly superior to the corresponding properties exhibited by the diallyl phthalate plastic. For power factor, dielectric constant, and loss factor, the diallyl 2,5-diphenyladipate plastic is either slightly superior or comparable to the diallyl phthalate plastic. Physical properties of the diallyl 2,5-diphenyladipate show that it is comparable in general to phthalate plastic being slightly superior for flexural strength but slightly inferior for strength in tension and compression. However, this difference in physical properties will provide greater resistance to failure by mechanical shock and this will be significantly advantageous in missile and aircraft applications. In addition, the diallyl 2,5-diphenyladipate plastic possesses lower density and thus provides lower weight while providing improved electrical properties. Also, the lower water absorption of the diallyl 2,5-diphenyladipate plastic insures superior electrical properties at high humidity and high temperature. For chemical resistance, the diallyl 2,5-diphenyladipate like the diallyl phthalate shows negligible effect by organic solvents and dilute acids and alkalies. However, where there is significant attack, as with concentrated sulfuric acid, the diallyl 2,5-diphenyladipate plastic is significantly and suprisingly superior.

Over and above the preparation of plastics utilizing diallyl 2,5-diphenyladipate as the sole polymerizable ester, it is within the scope of this invention to include use thereof with other polymerizable substances including; for example, other allyl esters such as diallyl phthalate, diallyl isophthalate, diallyl adipate, triallyl cyanurate, diallyl maleate, diallyl diglycollate and also other saturated or unsaturated esters such as methyl, ethyl, propyl, or butyl acrylate, methyl methacrylate, or other acrylate or alpha-substituted acrylate or vinyl chloride, vinyl acetate, styrene, etc. in which the diallyl 2,5-diphenyladipate is used in a proportional amount sufficient to impart to the plastic an improvement in desired properties over use of the supplementary ester alone. Still further, the monomer diallyl 2,5-diphenyladipate can be used as a cross-linking agent for unsaturated polyester based on maleic acid or other unsaturated acids to provide low volatility, low curing shrinkage, long storage stability, improved electrical, physical, and chemical properties.

The utilization of diallyl 2,5-diphenyladipate may also be extended to mixtures of the fusible prepolymer or monomer with other polymers such as polymers of methyl methacrylate, methyl chloracrylate, vinyl acetate, vinyl chloride, styrene, etc. and the mixture subjected to conditions of polymerization.

Prior art related to polymerizable plastisols include the incorporating of a polymerizable dimethacrylate or diacrylate type monomer in the plastisol or of curing an unsaturated plasticizer, such as an epoxy type, with various curing agents. These type compositions possess the disadvantage of poor stability, low elastic strength, and difficult control of curing rate.

In the use of the aforesaid diallyl ester of 2,5-diphenyladipic acid in vinyl plastisols, a highly desirable combination of desired properties are imparted to the plastisol and, for example, improved characteristics with respect to flexibility, toughness, hardness, electrical properties, viscosity stability and permanence properties, while providing plastisols that exhibit the facility in fabrication which is characteristic of monomeric plasticizers together with performance properties characteristic of polymeric plasticizers. For preparation of plastisols, the aforesaid diallyl ester may be used alone or together with supplementary substances (e.g., plasticizers or extenders) that belong (a) to the non-reacting class of substances such as the dialkyl phthalates and other known plasticizers for vinyls (e.g., polyvinyl chloride) and/or copolymerizing monomers such as the maleates, fumarates, itaconates, glycol dimethacrylates, glycol diacrylates, etc. Although the relative proportion of the diallyl ester to the other plasticizer or plasticizers may be varied to meet particular requirements while using the diallyl ester in amounts sufficient to impart the material improvements provided thereby, the diallyl ester is generally used in a weight ratio of allyl ester:comonomer of more than 1 and, for example, a ratio of 8 to 1 of the allyl ester per part of the comonomer although, for certain requirements, the diallyl ester imparts the desired improvements when used in a ratio as low as 0.1 part of the diallyl ester per part of the comonomer.

Regarding the total amount of plasticizer and/or combination of plasticizers including the diallyl 2,5-diphenyladipate in the plastisol compositions, the plasticizer content is generally within the range of from about 0.3 to about 1.10 parts by weight per part of the vinyl resin.

For such plastisols, during the fusion of which the diallyl ester undergoes controlled polymerization yielding products of superior properties, conventional curing catalysts may be used including, for purposes of illustration and not limitation, peroxide type catalysts such as t-butyl perbenzoate, t-butyl peracetate, t-butyl peroxyisobutyrate, p-chlorobenzoyl-peroxide, acetyl peroxide, benzoyl peroxide, 2,4-dichlorobenzoyl peroxide, and others. Furthermore, plastisols prepared by use of the aforesaid diallyl ester may also contain added ingredients such, for example, pigments, stabilizers, bodying agents, waxes, surface active agents, blowing agents, etc. As to the vinyl constituent, polyvinyl chloride is generally used but other vinyl dispersion type materials may also be used either alone or in combination with polyvinyl chloride or other such vinyl materials such as polyvinyl butyral resins; the copolymers of vinyl chloride and another polymerizable olefinically unsaturated compound such as vinyl acetate, vinyl propionate, methyl acrylate, butyl acrylate, methyl methacrylate, butyl methacrylate, acrylonitrile, vinylidene chloride, dibutyl maleate, etc.

In order to illustrate the preparation of plastisols utilizing diallyl 2,5-diphenyladipate, the following examples are set forth and which include, for comparison purposes, plastisols prepared with said diallyl ester with supplementary non-polymerizable plasticizers and use of plasticizers other than said diallyl ester. Following the examples, a tabulation is set forth containing data obtained from the resulting plastisols and which show the marked superiority in numerous properties imparted by use of the diallyl-2,5-diphenyladipate.

All of the plastisols set forth were prepared by the following procedure:

One hundred parts by weight of polyvinyl chloride dispersion grade resin (Geon 121) was dispersed with slow agitation to a homogeneous smooth, fluid paste of the following ingredients in parts by weight:

3—Paraplex G-62 (epoxy type plasticizer)
1—Thermolite 31 (tin stabilizer)
X—Plasticizer, as set forth in each example The dispersion was cast on a 6" x 6" chrome plated sheet mold and cured at 355° F. using variable curing times to obtain plastic sheets of 50 mil thickness.

Films 10 mils thick were also prepared using a draw-down blade to cast the film on glass plate. The films were cured (using 1% of t.-butyl perbenzoate) at various time cycles to control the degree of polymerization of the unsaturated diester and test specimens were cut from the cured sheets and evaluated for physical properties using the 10 mil specimens for the extraction tests and the 50 mil specimens for all other tests.

EXAMPLE 1

A plastisol was prepared in which the plasticizer consisted of 49 parts diallyl 2,5-diphenyladipate and 21 parts of di-2-ethylhexyl phthalate.

EXAMPLE 2

Same as Example 1 except that the plasticizer consisted of 56 parts of MG-1 monomer (polyethylene glycol dimethylacrylate) and 14 parts di-2-ethylhexyl phthalate.

EXAMPLE 3

Same as Example 1 except that the plasticizer consisted of 70 parts di-2-ethylhexylphthalate.

EXAMPLE 4

Same as Example 1 except that the plasticizer consisted of a 2:1 molar ratio of di-2-ethylhexyl maleate to diallyl 2,5-diphenyladipate (45 parts of the maleate and 25 parts of the adipate).

Comparison of data for the various plastisol compositions illustrates the utility and surprising superiority of plastisols containing diallyl 2,5-diphenyladipate. These advantages are shown in both processing of the liquid plastisol and in properties of the cured product. Excellent viscosity stability of the liquid plastisol and stability of the catalyzed plastisol permits ease of processing even example, excellent electrical properties are imparted by the diallyl 2,5-diphenyladipate.

| Test | ASTM No. | Units | Examples | | | |
|---|---|---|---|---|---|---|
| | | | 1 | 2 | 3 | 4 |
| Tensile strength | D-412-51T | p.s.i. | 2,800 | 2,760 | 2,000 | 2,260 |
| 100% Modulus | D-412-51T | p.s.i. | 1,350 | too rigid | 900 | 1,440 |
| Elongation | D-412-51T | Percent | 200 | very little | 385 | 750 |
| Torsional Stiffness @ 35° C. | D-1043-51 | p.s.i. | [1] N.D. | too rigid | [1] N.D. | 89,500 |
| Flexural Stiffness | D-747-58T | p.s.i. | 1,080 | 1,150 | 561 | 1,377 |
| Durometer Hardness | | | [2] 94(A₂) | 40(D) | 72(A₂) | 83(A₂) |
| Brittle Point | D-746-57T | °C | −45 | −10 | −45 | −40 |
| 1% Ivory Soap Ext | D-1239-55 | Percent | 5 | N.D.[1] | 4.1 | 8.5 |
| Hexane Ext | D-1239-55 | Percent | 4.1 | N.D.[1] | 32.6 | 17.6 |
| Brookfield Viscosity (20 r.p.m.) | | | | | | |
| Initial Viscosity: | | | | | | |
| 20 r.p.m | | Cps | 12,700 | 3,700 | 1,200 | 2,200 |
| 3 r.p.m | | | 8,800 | 6,800 | 2,100 | 4,200 |
| 24 Hr. Viscosity: | | | | | | |
| 20 r.p.m | | Cps | 16,300 | 5,300 | 1,940 | 2,600 |
| 3 r.p.m | | | 8,600 | 9,200 | 3,500 | 4,600 |
| 4 Week Viscosity: | | | | | | |
| 20 r.p.m | | Cps | 13,800 | 18,800 | 6,990 | 5,200 |
| 3 r.p.m | | | 9,000 | 37,000 | 14,600 | 11,000 |
| Cure Time | | Mins | 15-20 | 15 | 30 | 30-45 |
| Catalyzed Stability | | Hrs | >24 | 1-3 | | >24 |

[1] N.D.=not determined.
[2] Denotes Durometer scale with scale D being for hardnesses greater than A₂.

after storage. Versatility of curing rate also provides the advantage of control of properties of the cured plastic product and reduced rejection of overcured products. With diallyl 2,5-diphenyladipate, the cured products in general are semi-rigid but hardness can be increased and controlled with the curing rate. The diallyl 2,5-diphenyladipate type plastisol exhibits high tensile strength together with good elongation. In comparison, the polyethylene glycol dimethylacrylate type plastisols have high tensile strength but very little to no elongation. These MG-1 type plastisols are hard, brittle, and crack easily with impact while the diphenyladipate plastisol products have excellent resistance to impact. This advantage is further illustrated by the superior low temperature brittleness and flexural strength of the diphenyladipate plastisol. In addition, the advantage of low extraction of plasticizer by solvent or soap solution is obtained without the high plastisol viscosity obtained when a polymeric plasticizer is employed. Example 3 illustrates that the superior strength and hardness properties are not obtained with a standard primary plasticizer (di-2-ethylhexyl phthalate). The combination of superior processing and product properties is obtained with polymerizable esters of 2,5-diphenyladipic acid and preferably diallyl 2,5-diphenyladipate. In addition to the improvements noted in the While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:
1. Diallyl 2,5-diphenyladipate.
2. A thermoset polymer of diallyl 2,5-diphenyladipate.
3. A vinyl plastisol composition comprising a polyvinyl resin plasticized with diallyl 2,5-diphenyladipate.
4. A vinyl plastisol composition comprising polyvinyl chloride plasticized with diallyl 2,5-diphenyladipate.

References Cited in the file of this patent
UNITED STATES PATENTS

| | | |
|---|---|---|
| 2,155,590 | Garvey | Apr. 25, 1939 |
| 2,249,768 | Kropa | July 22, 1941 |
| 2,433,616 | Marple et al. | Dec. 30, 1947 |
| 2,448,259 | Finch | Aug. 31, 1948 |
| 2,476,922 | Shokal et al. | July 19, 1949 |
| 2,526,395 | Nichols et al. | Oct. 17, 1950 |
| 2,625,527 | Smith et al. | Jan. 13, 1953 |
| 2,880,196 | Frank et al. | Mar. 31, 1959 |